United States Patent [19]

Pfalzer et al.

[11] 4,194,968

[45] Mar. 25, 1980

[54] METHOD AND APPARATUS FOR SEPARATING MAGNETIC PARTICLES FROM WASTE PAPER

[75] Inventors: Lothar Pfalzer; Siegbert Fischer, both of Heidenheim, Fed. Rep. of Germany

[73] Assignee: J. M. Voith GmbH, Heidenheim, Fed. Rep. of Germany

[21] Appl. No.: 951,192

[22] Filed: Oct. 13, 1978

[30] Foreign Application Priority Data

Oct. 11, 1977 [DE] Fed. Rep. of Germany ....... 2750191

[51] Int. Cl.² .............................................. B03C 1/14
[52] U.S. Cl. .......................................... 209/3; 209/38; 209/214; 209/224; 162/4; 162/55
[58] Field of Search ................ 162/5, 4, 8, 55; 209/3, 209/38-40, 214, 221, 223 R, 224, 232

[56] References Cited

U.S. PATENT DOCUMENTS

| 707,088 | 8/1902 | Dings | 209/38 |
| 3,087,616 | 4/1963 | Pierson | 209/221 |
| 3,197,028 | 7/1965 | Watson et al. | 209/221 |
| 3,405,873 | 10/1968 | Gothard et al. | 241/38 |
| 3,969,226 | 7/1976 | Moelders | 209/39 |

*Primary Examiner*—Ralph J. Hill
*Attorney, Agent, or Firm*—Albert L. Jeffers

[57] ABSTRACT

Waste paper is fed into a horizontal drum and therein treated with suitable liquids to form pulp. A magnetic device is disposed adjacent one side of the drum to produce a magnetic field along one arcuate section and extending from the upper portion toward the bottom thereof. Magnetic particles mixed with the paper are carried by said arcuate section of the drum by virtue of the influence of the magnetic field until they reach the top where they leave the field and then fall downwardly into an inclined trough from which they gravitate to the exterior of the drum. Pulp is concurrently discharged from the drum.

9 Claims, 3 Drawing Figures

METHOD AND APPARATUS FOR SEPARATING MAGNETIC PARTICLES FROM WASTE PAPER

BACKGROUND OF THE INVENTION

The present invention relates to the production of pulp from waste paper and more particularly to the separation of foreign magnetic matter from the waste paper while the pulp is being produced.

The present invention further relates to apparatus for the handling or processing of waste paper, which includes a drum or cylinder rotatable upon supporting rollers, the drum being equipped at the front side with an opening through which the paper to be reprocessed is fed, vanes which repeatedly lift and drop the paper, and further with feed conduits for introducing thereinto chemical solutions.

Description of the Prior Art

Similar apparatus is described in the West German published Application No. 2,547,896. The fiber material is disclosed as being dissolved within a rotating drum equipped with a perforated jacket and having ribs which extend essentially longitudinally of said drum. The paper is digested under the action of the rotation, of the lifting ribs and of the impregnating chemicals, the paper in its disintegrated state being removed across the perforated jacket of the drum, the impurities being removed at the front side of the drum opposite the feed side.

A problem with this installation is that the impurities contained in the paper, expecially metallic particles, interfere with the impregnation and furthermore may cause damage to the drum. Thus bales of paper which are kept together by a wire mesh may result in the wire becoming wound around drum parts and/or divided into the mass of paper pulp.

SUMMARY OF THE INVENTION

The invention disclosed herein solves the problem in the processing of waste paper containing ferromagnetic metallic particles by separating out the latter in a simple, reliable manner. A magnetic device is disposed adjacent one portion of the surface of the drum thereby to attract and retain such particles on the inner drum surface as it rotates. Mounted within the drum is an inclined trough disposed to receive the gravitating particles which are released from the drum as they reach an elevated position therein, the trough collecting the particles for discharge. Metallic particles which are attracted by a magnet are thus, in a simple manner, separated from the paper. These metallic particles during the rotation of the drum become retained in the region of the periphery where the field of the magnetic device exists, on the inner wall of the drum. As long as the magnetic device remains active such particles will remain on the wall of the drum. Located at the end of the influence of the magnetic device is a collecting trough into which the particles drop automatically. The metallic particles which are contained in the paper will in general become separated in the region of the magnetic action during one revolution of the drum.

One embodiment of the invention utilizes a magnet spaced a small distance from the outside of the drum periphery, the magnet extending across an arcuate portion of the drum.

For another embodiment the drum is subdivided into individual electro-magnetic segments which along a certain arcuate section of the drum become activated due to the action of a slip ring (sliding contact ring). In this structure the segments are selectively energized in response to the rotation. This offers the advantage that the iron particles adhere to the magnetized drum wall only, and do not slide therealong during drum rotation.

The drum of this invention has opposite open ends with the wall being impermeable. Waste paper is introduced into one end and the impregnated mass of paper, which may be in the form of pulp, emerges from the other end. Pulp that is formed does not become diluted whereby the digestion of the waste paper is rendered possible in the high density, high consistency region which results in an economy in the quantity of chemicals required.

If one, however, desires to increase the liquidation of the pulp, it is advantageous to provide a multiplicity of holes in the bottom of the collecting trough for the passage of the pulp therethrough into the bottom of the drum. This avoids excessive pulp from becoming entrained with the metallic particles as they are being collected and discharged.

Nozzles for spraying liquid or the material collected by the trough may be provided for further separation of the paper from the metallic particles. For the purpose of aiding in the discharge of the material collected by the trough, a scraping device may be employed which positively removes the metallic particles therefrom.

Desirably, the collecting trough is mounted to decline in the direction of discharge of material from the drum. The material collected by the trough thus gravitates to the discharge end thereby avoiding the necessity of using a scraping device as aforesaid.

It is an object of this invention to provide an apparatus and method for separating metallic articles from waste paper in a simple and reliable manner.

It is yet another object of this invention to provide an apparatus and method for separating metallic articles from waste paper while simultaneously therewith forming the paper into a pulp.

A further object of this invention is the forming of the drum into individual magnetic segments so that the magnet rotates within the drum whereby a certain section of the drum becomes activated by a slip ring. The iron particles in this embodiment will adhere to the wall of the rotating drum and will not slide within the drum.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
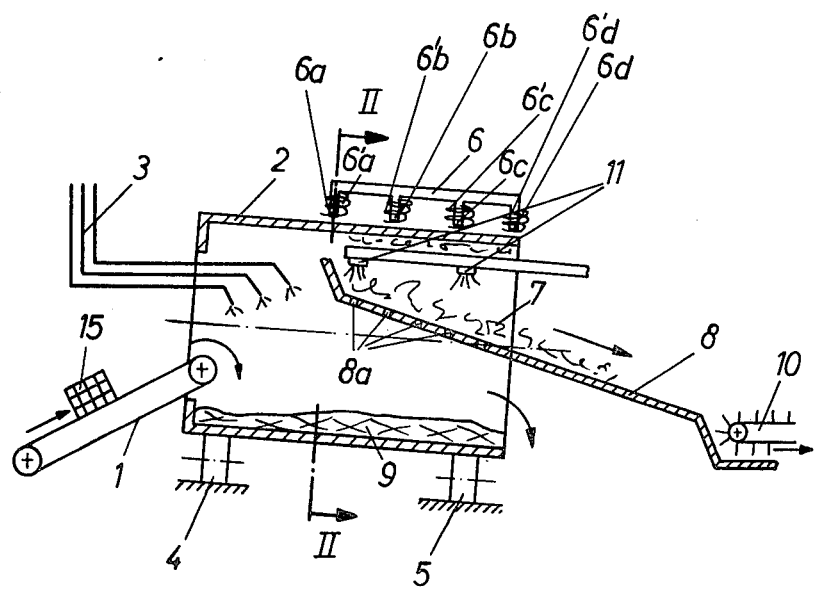
FIG. 1 is a side view partially sectioned longitudinally and in diagramatic form of one embodiment of this invention.
Figure 2:
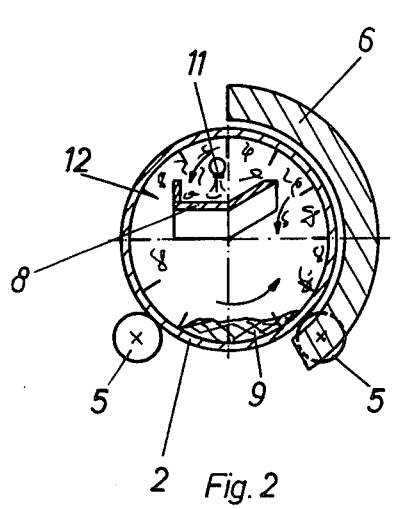
FIG. 2 is a cross section taken substantially along section line 2—2 of FIG. 1.

Waste paper in the form of bales as indicated by the numeral 15 are transported by means of a conveyor belt 1 through the open end into a rotating drum 2, the drum wall being closed or otherwise impermeable to the flow of liquid therethrough. A series of pipes or conduits 3 conduct suitable liquid chemical solutions through the open end of and into the drum, these solutions being those normally required for forming pulp of the waste paper within the drum. The solutions mix with and impregnate the waste paper. Secured to the inside of the drum are entrainment strips 12 which may be in the form of metallic vanes, bars and the like extending longitudinally of the drum, these being so arranged that during drum rotation, the waste paper deposited into the drum will be carried upwardly by the drum to fall from the upper portion in a parabolic path to the bottom of the drum. The drum 2 rests on supporting rollers 4 and 5 which serve to rotate the drum.

Fixedly mounted adjacent to the exterior of the drum is a magnetic device 6 shown as being arcuate in shape and provided with four radially inwardly extending poles indicated by the reference numerals 6a, 6b, 6c and 6d. Each of the poles carry magnetizing coils $6'a$, $6'b$, $6'c$ and $6'd$, respectively, connected to a suitable source of energizing voltage thereby to energize each of the respective poles 6a, 6b, 6c and 6d. The coils $6'a$, $6'b$, $6'c$ and $6'd$ may be wound about the longitudinal extent of the pole pieces themselves, the coils thus conforming to the arcuate shape thereof. Upon energization, the magnetic device 6 produces a field which attracts ferromagnetic particles within the drum to the wall thereof at a location juxtaposed with respect to the magnetic device 6.

As the drum 2 rotates, magnetic particles 7 will be adhered to the wall thereof, as aforestated, in the region radially opposite the magnetic device 6. When the particles reach a position, assuming the drum to be rotating counterclockwise, beyond the upper end of the magnetic device 6, the attracting force of the magnetic device 6 ends whereupon the particles are released and dropped from the drum wall. It should be stated at this point that the material of the drum 2 itself must be compatible with this mode of operation, and in one embodiment may be of a non-ferrous material, such as aluminum or the like.

A channel or trough 8 is mounted in an inclined position as shown in FIG. 1 with one end portion being disposed within the drum immediately beneath the upper portion thereof where the particles 7 gravitate from the drum wall. The particles 7 gravitate down the trough to the discharge end where they are engaged by a scraping device 10 in the form of an endless belt carrying flexible vanes disposed adjacent to and operatively engaging the bottom of the trough. As the scraping device 10 operates, it forcefully removes the particles and foreign material from the trough. The bottom of the trough 8 may be provided with a multiplicity of apertures 8a through which pulp which is sufficiently liquified may pass. For liquifying the paper or pulp that may drop into the trough 8, nozzles 11 are disposed thereabove to spray the collected materials with suitable liquid. The pulp material that flows through the apertures 8a drops into the bottom of the drum 2 and is thereby recovered. The metallic particles 7 which are too large to pass through apertures 8a, gravitate down the trough 8 to the discharge end thereof. The drum 2 is inclined slightly toward the right-end from which the impregnated waste paper is discharged by gravity.

The treatment of the waste paper inside the drum 2 may be controlled to maintain the density of the paper content in the high density region, i.e., the paper density is greater than 10% by volume of the total materials introduced into the drum or the paper content may be controlled to be sufficiently low, that is below 10%, in which event the drum 2 is provided with a perforated jacket surface similar to the one disclosed in the aforesaid West German published Application No. 2,547,896. In either event, the ferromagnetic particles mixed with the waste paper introduced into the drum are separated and discharged via the trough 8.

Figure 3:
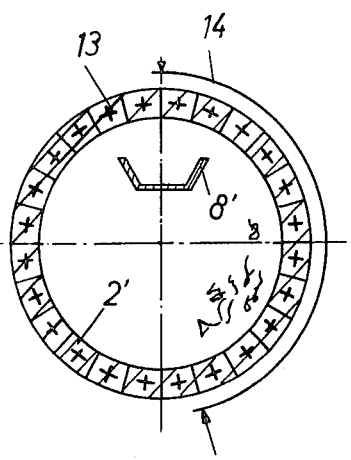
FIG. 3 is a cross section similar to that of FIG. 2 but of a second embodiment of this invention.

Referring to FIG. 3, the drum 2' is subdivided into individual electromagnetic segments 13 which are activated by means of a slip ring 14. Use of the slip ring serves in switching the individual electromagnetic segments "on" and "off" during rotation of the drum within the arcuate extent of a certain preselected section of the slip ring 14. During rotation of the drum 2', the energized electromagnetic segments 13, which are located on the right side of the drum 2' radially opposite the slip ring 14 retains the magnetic particles thereon until they reach the upper portion of the drum 2' where the segments 13 are deenergized. The segments 13 are provided with individual coils (not shown) which are energized by slip ring 14 and deenergized when they move past slip ring 14. The slip ring 14 is connected to a suitable source of energizing voltage thereby to energize each of the segments 13. The magnetic particles there drop into the collecting trough 8'.

While there have been described above the principles of this invention in connection with specific apparatus, it is to be clearly understood that this description is made only by way of example and not as a limitation to the scope of the invention.

What is claimed is:

1. Apparatus for processing waste paper comprising an open ended drum supported for rotation about its axis arranged substantially horizontally, means for feeding waste paper into one end of said drum, said drum carrying means for lifting and dropping material during rotation thereof, means for magnetically adhering ferromagnetic particles, which may be mixed with said waste paper to only a first arcuate portion of the wall of said drum and releasing adhered particles for the remaining arcuate portion thereof, said arcuate portion extending downwardly from the upper portion of said drum and being on the side of the drum which is moving upwardly, and means for collecting such particles as they drop from the upper portion of said drum, thereby separating such particles from the waste paper, said collecting means including an inclined trough extending from an upper position adjacent said drum through the other end thereof to a lower position, whereby material collected from said drum gravitates down said trough to the exterior of said drum, means for introducing treating solutions into said drum, said trough having a multiplicity of perforations in the bottom thereof, and further means for applying a liquid medium into said trough for increasing the liquidity of the material in said trough.

2. The apparatus of claim 1 wherein said adhering means includes individual magnet segments adapted to be energized in a predetermined position by the interposition of a slip ring.

3. The apparatus of claim 1 wherein said adhering means includes a magnet disposed adjacent to said drum.

4. The apparatus of claim 3 wherein said magnet includes arcuate pole pieces spaced apart axially of said drum, and each pole piece having an energizing coil.

5. The apparatus of claim 1 wherein said further means includes spraying nozzles and said introducing means includes at least one conduit, and means for removing material from said trough at the lower end portion thereof.

6. The apparatus of claim 5 wherein said removing means includes a scraping device in the form of an endless belt having vanes thereon operatively engageable with said trough.

7. The method of separating ferromagnetic particles from waste paper during liquid treatment of the latter comprising the steps of introducing a mixture of waste paper and ferromagnetic particles into a rotating drum and magnetically adhering such particles to an arcuate portion of said drum extending from the upper toward the lower portion thereof, said arcuate portion being that which is moving upwardly whereby such particles are released from said drum as they pass beyond said arcuate portion at the upper side of said drum, introducing liquid into said drum for forming pulp therefrom, collecting pulp and such particles as they are released and separately conducting such particles to the exterior of said drum, further wetting such pulp as it is collected along with such particles, and separating such further wetted pulp from said particles before they are conducted to the exterior of said drum.

8. The method of claim 7 wherein said step of adhering includes applying a magnetic field to said arcuate portion.

9. The method of claim 7 wherein a perforated trough is disposed to collect such pulp and particles, said wetting step including spraying a liquid into said trough to further wet said pulp which thereby flows through the perforations.

* * * * *